(12) United States Patent
MacKay

(10) Patent No.: US 8,240,386 B2
(45) Date of Patent: Aug. 14, 2012

(54) METHOD FOR TREATING WELL BORE WITH POLYURETHANE COMPOSITION

(75) Inventor: Bruce A. MacKay, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 312 days.

(21) Appl. No.: 12/650,050

(22) Filed: Dec. 30, 2009

(65) Prior Publication Data

US 2011/0155374 A1 Jun. 30, 2011

(51) Int. Cl.
*E21B 43/16* (2006.01)

(52) U.S. Cl. ........................ 166/300; 166/305.1; 166/302

(58) Field of Classification Search .................. 166/276, 166/300, 305.1, 302
See application file for complete search history.

(56) References Cited

U.S. PATENT DOCUMENTS

| | | | |
|---|---|---|---|
| 2,761,511 A | 9/1956 | Billue | |
| 2,867,278 A | 1/1959 | Mallory et al. | |
| 2,889,883 A | 6/1959 | Santora et al. | |
| 3,181,611 A | 5/1965 | Dollarhide | |
| 3,181,612 A | 5/1965 | West et al. | |
| 3,379,253 A | 4/1968 | Chism | |
| 3,623,330 A | 11/1971 | Nakade et al. | |
| 3,682,245 A | 8/1972 | Argabright et al. | |
| 3,726,340 A | 4/1973 | Fraser | |
| 3,878,686 A | 4/1975 | Hageman et al. | |
| 4,365,670 A * | 12/1982 | McLaughlin | 166/295 |
| 4,770,257 A | 9/1988 | Kondo et al. | |
| 4,788,083 A * | 11/1988 | Dammann et al. | 427/340 |
| 4,958,685 A | 9/1990 | Hihara et al. | |
| 5,093,379 A * | 3/1992 | Tiao et al. | 521/129 |
| 5,199,491 A | 4/1993 | Kutta et al. | |
| 6,348,121 B1 * | 2/2002 | Schoener et al. | 156/307.1 |
| 2009/0068471 A1 * | 3/2009 | Choi et al. | 428/408 |
| 2009/0143257 A1 * | 6/2009 | Teng et al. | 507/219 |
| 2010/0087566 A1 * | 4/2010 | Ballard | 523/130 |

FOREIGN PATENT DOCUMENTS

| | | |
|---|---|---|
| WO | 2008077499 | 7/2008 |
| WO | 2008134 59 | 11/2008 |

OTHER PUBLICATIONS

SPE1237—A Deformable Material for Sand Consolidation—Spurlock, J.W., Howard, G.C., Bearden, W.G., Blenkarn, K.A. Journal of Petroleum Technology, Mar. 1966, Sand Control—pp. 306-312.
SPE74556—Polyurethane Grouting Geothermal Lost Circulation Zones—Mansure, A.J. Presented at the IADC/SPE Drilling Conference held in Dallas, Texas, Feb. 26-28, 2002.
SPE121676—An Improved Oil-Based Chemical Gel System for Wellbore Stabilization—Scosorne, J.T., Sanders, M.W,, and Patel, A.D. Presented at the 2009 SPE International Symposium on Oilfield Chemistry held in The Woodlands, Texas, USA, Apr. 20-22, 2009.

* cited by examiner

*Primary Examiner* — Angela M DiTrani
*Assistant Examiner* — Catherine Loikith
(74) *Attorney, Agent, or Firm* — Michael Dae; Daryl Wright; Robin Nava

(57) ABSTRACT

A method comprising providing a composition with at least one isocyanate including a blocking group able to be unblocked at or above a deblocking temperature, contacting the composition with an inactivated catalyst and at least one active hydrogen compound, exposing the composition to a trigger to activate the catalyst, creating an elastomeric gel composition, and exposing the composition to a temperature above the deblocking temperature with a second downhole tool, wherein the second downhole tool is able to generate microwaves is provided.

24 Claims, 1 Drawing Sheet

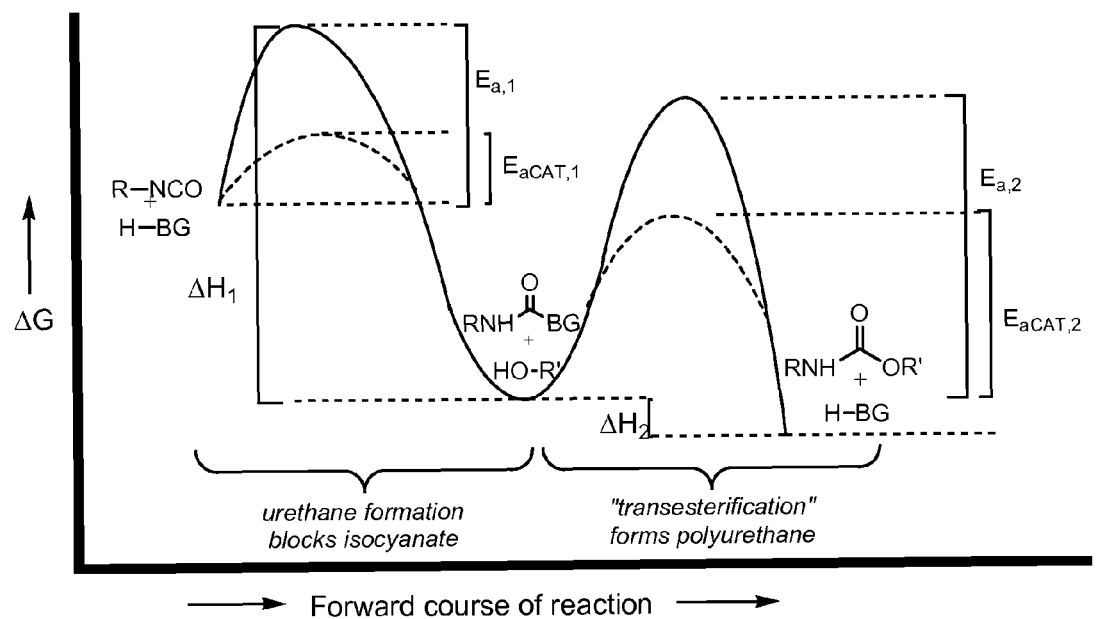

METHOD FOR TREATING WELL BORE WITH POLYURETHANE COMPOSITION

FIELD

Embodiments of the invention to methods for treating a well bore within a subterranean formation, and the use of polyurethane compositions as a remedy for lost circulation in drilling wells, and in some instances, use of polyurethane compositions that are not chemically activated until delivered to a loss zone via a downhole tool.

BACKGROUND

The statements in this section merely provide background information related to the present disclosure and may not constitute prior art.

Major to catastrophic lost circulation is a persistent and expensive problem in drilling and cementing. Polyurethane composition (PU) has been proposed repeatedly as a lost circulation material (LCM) over the last five decades—it is attractive for this use because the gelation time is under chemical control. In general, the chemistry of gelation starts when a polyalcohol/polyamine is blended with a polyisocyanate to give a fluid that will cure to a solid mass. In previous efforts, such fluids are either mixed with catalysts and/or retarders at surface prior to pumping, as shown in U.S. Pat. No. 3,181,611 and U.S. Pat. No. 3,181,612, both to Dollarhide, or formed downhole by some tool or trick of plumbing that mixes the polyalcohol and polyisocyanate in situ, as shown in U.S. Pat. No. 3,726,340 to Fraser. All references above are incorporated herein in their entirety, by reference thereto.

A PU LCM must have a pumpable rheology when uncured. After curing begins, the LCM should develop a rheology that will effectively sweep drill mud from the loss zone. It should achieve final cure in the loss zone. Failure to control the onset of gelation and the rate of gelation are the major causes of failure when PU LCMs have been applied.

In general, the process of PU gelation starts when a polyalcohol/polyamine is blended with a polyisocyanate to give a fluid that will cure to a solid mass. In previous efforts, such fluids are either mixed with catalysts and/or retarders at surface prior to pumping, or formed downhole by some tool or trick of plumbing that mixes the polyalcohol and polyisocyanate in situ. Since knowledge of the transit time and/or temperature profile the fluid will experience on the way to the loss zone is highly imperfect, the chances of failure due to incorrect gelation time are high. A fluid that responds to some "cue" or trigger that is unique to the appropriate wellbore location is therefore desirable.

Triggerable setting has been identified as the major technical barrier to success in previous attempts to apply polyurethane to major to catastrophic lost circulation to large natural fractures. A polyurethane fluid that begins to set only on a chemical cue provided at or near the loss zone stands the best chance of sweeping the drill mud efficiently and setting in the loss zone, and presents the least risk of premature setting. A solution to triggerable setting will allow oilfield engineers to simultaneously solve problems relating to physical placement (location of LCM in the natural fracture and effective displacement of mud already in the fracture) and setting time (start and rate of gelation) of a dynamically thickening polyurethane-based chemical LCM, giving a robust, reliable solution to this problem. In other words, a chemical LCM has to be delivered accurately to a loss-causing feature and designed to set only when it has been so delivered.

Conventional approaches to triggering have fallen into two broad categories: the mixture of the polyisocyanate ("A side") and polyalcohol ("B side") components at operating depth by means of a static mixer (see for example Mansure SPE74556) or other tool, or mixture of the A and B sides prior to injection with some chemical control over the reaction rate (see for example Spurlock SPE1237). The former method can be thought of as "grouting at depth" and the latter is operationally equivalent to cementing in that the LCM is chemically engineered to have a particular setting time based on the temperature profile it will experience during placement. References disclosed above are incorporated herein in their entirety, by reference thereto.

Water is a common potential contaminant in the flow path, wellbore, and formation. Water reacts with isocyanates to form $CO_2$ gas and amines. This process is roughly one tenth as fast as the isocyanate-alcohol reaction that builds strength. However, amines react with isocyanates 10 to 100 times faster than alcohols to form urea linkages. Strict control over chemical kinetics when water is present is very difficult and although PU that is "allowed to solidify by the agency of water" has been described in the past (see for instance U.S. Pat. No. 3,623,330 to Nakade, incorporated by reference herein in its entirety) the technique as described is unreliable because water has a direct effect on control over setting time, which in turn affects reliability. Setting time and physical placement must be simultaneously controlled to deliver a good plug. Since it is almost impossible to completely guarantee a water-free flow path, any system that mixes isocyanates and polyols to begin the gelation process is susceptible to water contamination and is therefore not reliable. All of these problems are greatly exacerbated at elevated temperatures.

An alternative method for lost circulation is proposed herewith.

SUMMARY

In a first aspect, a method of treating a wellbore is disclosed. The method provides a composition with at least one isocyanate including a blocking group able to be unblocked at or above a deblocking temperature; introduces the composition into the wellbore; contacts the composition with an inactivated catalyst and at least one active hydrogen compound; exposes the composition to a triggerable to activate the catalyst and to temperature above the deblocking temperature; and creates an elastomeric gel composition.

In a second aspect, the method provides a composition with a first filler and at least one isocyanate including a blocking group able to be unblocked at or above a deblocking temperature; introduces the composition into the wellbore; contacts the composition with at least one active hydrogen compound; exposes the composition to temperature above the deblocking temperature allowing the blocking group to be scavenged by the first filler; and creates an elastomeric gel composition.

In a third aspect, a method of treating lost circulation of a wellbore is disclosed. The method provides a composition with a first filler and at least one isocyanate including a blocking group able to be unblocked at or above a deblocking temperature; introduces the composition into the wellbore; contactes the composition with at least one active hydrogen compound; exposes the composition to temperature above the deblocking temperature allowing the blocking group to be scavenged by the first filler; and creates an elastomeric gel composition to treat lost circulation.

BRIEF DESCRIPTION OF THE DRAWINGS

FIG. 1 shows a schematic diagram of the activation energy of the reaction between unblocked isocyanate with a generalized blocking group, followed thereafter by the reaction between the blocked isocyanate with polyols and/or polyamines.

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

Polyurethanes are typically produced by the polyaddition reaction of a polyisocyanate with a polyalcohol (polyol). A polyisocyanate is a molecule containing two or more isocyanate functional groups, R—(N=C=O)$_n$ with n>2, and a polyol is a molecule having two or more hydroxyl functional groups, R'—(OH)$_n$ with n>2. The reaction product is a polymer containing the urethane linkage, —RNHCOOR'—, formed by the reaction between an isocyanate group and a hydroxyl group. On the other way, polyureas are produced by the polyaddition reaction of a polyisocyanate with a polyamine. As stated above, a polyisocyanate is a molecule containing two or more isocyanate functional groups, R—(N=C=O)$_n$ with n>2, while a polyamine is a molecule having two or more amine functional groups, R'—(NH$_2$)$_n$ with n>2. The reaction product is a polymer containing the urea linkage, —RNHCNHR'—, formed by the reaction between an isocyanate group with an amine group. Thus, in some embodiments, the polymers are formed from isocyanates which may react with an active hydrogen compound to form an elastomeric, gelatinous structure.

Isocyanates useful in embodiments disclosed herein may include isocyanates, polyisocyanates, and isocyanate prepolymers. Suitable polyisocyanates include any of the known aliphatic, alicyclic, cycloaliphatic, araliphatic, and aromatic di- and/or polyisocyanates. Inclusive of these isocyanates are variants such as uretdiones, biurets, allophanates, isocyanurates, carbodiimides, and carbamates, among others.

Aliphatic polyisocyanates may include hexamethylene diisocyanate, trimethylhexamethylene diisocyanate, dimeric acid diisocyanate, lysine diisocyanate and the like, and biuret-type adducts and isocyanurate ring adducts of these polyisocyanates. Alicyclic diisocyanates may include isophorone diisocyanate, 4,4'-methylenebis(cyclohexylisocyanate), methylcyclohexane-2,4- or -2,6-diisocyanate, 1,3- or 1,4-di (isocyanatomethyl)cyclohexane, 1,4-cyclohexane diisocyanate, 1,3-cyclopentane diisocyanate, 1,2-cyclohexane diisocyanate, and the like, and biuret-type adducts and isocyanurate ring adducts of these polyisocyanate. Aromatic diisocyanate compounds may include xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluydine diisocyanate, 4,4'-diphenyl ether diisocyanate, m- or p phenylene diisocyanate, 4,4'-biphenylene diisocyanate, 3,3'-dimethyl-4,4'-biphenylene diisocyanate, bis(4-isocyanatophenyl)-sulfone, isopropylidenebis (4-phenylisocyanate), and the like, and biuret type adducts and isocyanurate ring adducts of these polyisocyanates. Polyisocyanates having three or more isocyanate groups per molecule may include, for example, triphenylmethane-4,4',4''-triisocyanate, 1,3,5-triisocyanato-benzene, 2,4,6-triisocyanatotoluene, 4,4'-dimethyldiphenylmethane-2,2',5,5'-tetraisocyanate, and the like, biuret type adducts and isocyanurate ring adducts of these polyisocyanates. Additionally, isocyanate compounds used herein may include urethanation adducts formed by reacting hydroxyl groups of polyols such as ethylene glycol, propylene glycol, 1,4-butylene glycol, dimethylolpropionic acid, polyalkylene glycol, trimethylolpropane, hexanetriol, and the like with the polyisocyanate compounds, and biuret type adducts and isocyanurate ring adducts of these polyisocyanates.

Other isocyanate compounds may include tetramethylene diisocyanate, toluene diisocyanate, hydrogenated diphenylmethane diisocyanate, hydrogenated xylylene diisocyanate, and trimers of these isocyanate compounds; terminal isocyanate group-containing compounds obtained by reacting the above isocyanate compound in an excess amount and a low molecular weight active hydrogen compounds {e.g., ethylene glycol, propylene glycol, trimethylolpropane, glycerol, sorbitol, ethylenediamine, monoethanolamine, diethanol amine, Methanol amine etc.} or high molecular weight active hydrogen compounds such as polyesterpolyols, polyetherpolyols, polyamides and the like may be used in embodiments disclosed herein Other useful polyisocyanates include, but are not limited to 1,2-ethylenediisocyanate, 2,2,4- and 2,4,4-trimethyl-1,6-hexamethylenediisocyanate, 1,12-dodecandiisocyanate, omega, omega-diisocyanatodipropylether, cyclobutan-1,3-diisocyanate, cyclohexan-1,3- and 1,4-diisocyanate, 2,4- and 2,6-diisocyanato-1-methylcylcohexane, 3-isocyanatomethyl-3,5,5-trimethylcyclohexylisocyanate ("isophoronediisocyanate"), 2,5- and 3,5-bis-(isocyanatomethyl)-8-methyl-1,4-methano, decahydronaphthathalin, 1,5-, 2,5-, 1,6- and 2,6-bis-(isocyanatomethyl)-4,7-methanohexahydroindan, 1,5-, 2,5-, 1,6- and 2,6-bis-(isocyanato)-4,7-methanohexahydroindan, dicyclohexyl-2,4'- and -4,4'-diisocyanate, omega, omega-diisocyanato-1,4-diethylbenzene, 1,3- and 1,4-phenylenediisocyanate, 4,4'-diisocyanatodiphenyl, 4,4'-diisocyanato-3,3'-dichlorodiphenyl, 4,4'-diisocyanato-3,3'methoxydiphenyl, 4,4'-diisocyanato-3,3'-diphenyï-diphenyl, naphthalene-1,5-diisocyanate, N—N'-(4,4'-dimethyl-3,3'-diisocyanatodiphenyl)-uretdion, 2,4,4'-triisocyanatano-diphenylether, 4,4',4''-IrUsOcyanatotriphenylmethant, and tris(4-isocyanatophenyl)-thiophosphate.

Other suitable polyisocyanates may include: 1,8-octamethylenediisocyanate; 1,11-undecane-methylenediisocyanate; 1,12-dodecamethylendiisocyanate; 1-isocyanato-3-isocyanatomethyl-3,5,5-trimethylcyclohexane; 1-isocyanato-1-methyl-4(3)-isocyanatomethylcyclohexane; 1-isocyanato-2-isocyanatomethylcyclopentane; (4,4'- and/or 2,4'-) diisocyanato-dicyclohexylm ethane; bis-(4-isocyanato-3-methylcyclohexyl)-methane; a,a,a',a'-tetramethyl-1,3- and/or -1,4-xylylenediisocyanate; 1,3- and/or 1,4-hexahydroxylylene-diisocyanate; 2,4- and/or 2,6-hexahydrotoluene-diisocyanate; 2,4- and/or 2,6-toluene-diisocyanate; 4,4'- and/or 2,4'-diphenylmethane-diisocyanate; n-isopropenyl-dimethylbenzyl-isocyanate; any double bond containing isocyanate; and any of their derivatives having urethane-, isocyanurate-, allophanate-, biuret-, uretdione-, and/or iminooxadiazinedione groups.

Polyisocyanates may also include aliphatic compounds such as trimethylene, pentamethylene, 1,2-propylene, 1,2-butylene, 2,3-butylene, 1,3-butylene, ethylidene and butylidene diisocyanates, and substituted aromatic compounds such as dianisidine diisocyanate, 4,4'-diphenylether diisocyanate and chlorodiphenylene diisocyanate.

Other isocyanate compounds are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is hereby incorporated by reference. Isocyanates formed from polycarbamates are described in, for example, U.S. Pat. No. 5,453,536, hereby incorporated by reference herein. Carbonate isocyanates are described in, for example, U.S. Pat. No. 4,746,754, hereby incorporated by reference herein.

However, in order to prevent premature reaction with the active hydrogen compound, and thus gellation, the isocyanate is a blocked isocyanate. Blocked isocyanates are relatively recent in polyurethane technology. A blocked isocyanate is pre-reacted with a blocking group that is chemically related to a polyol or polyamine in that it has a nucleophilic atom (generally C, O, or N) and a transferrable proton to form a urethane, urea, or carboxamide linkage. Above a certain characteristic "deblocking" temperature, the blocked isocyanate will undergo reactions with polyols and/or polyamines to form polymer, but below the deblocking temperature the blocked isocyanate is chemically unreactive.

The coatings industry has made extensive use of blocked isocyanates to prepare coating formulations with extremely good shelf lives (unreactive blocked isocyantes intimately mixed with polyols that retain their chemical activity for months to years). The coating formulations only react to form polymeric PU films above the deblocking temperature, and this process is irreversible because the blocking groups are selected for their volatility (i.e. they boil off and are no longer in the film to reverse the formation of polymer via urethane bond formation). FIG. 1 shows the activation energies of the involved reactions. The reaction on the right is between unblocked isocyanate and a generalized blocking group H—BG to give RNH—(C=O)—BG, the blocked isocyanate. This reaction has a large enthalpy $\Delta H_1$, roughly 26 kCal. $mol^{-1}$. The unblocked isocyanate react with the blocking group H—BG after the activation energy $E_{a,1}$ is overcome. With a first catalyst, said activation energy is reduced to $E_{aCAT,1}$. Thereafter, the blocked isocyanate can react with a polyol HO—R' to give polymer and free blocking group, but only if the high activation energy $E_{a,2}$ is overcome—this is the basis of the deblocking temperature. With a second catalyst, said activation energy is reduced to $E_{aCAT,2}$.

Blocked isocyanates are typically manufactured starting from acidic hydrogen-containing compounds such as phenol, ethyl acetoacetate and ε-caprolactam. Typical unblock temperatures range between 90 to 200° C., depending on the isocyanate structure and blocking agent. For example, aromatic isocyanates are typically unblocked at lower temperatures than those required to unblock aliphatic isocyanates. The dissociation temperature decreases according to the following order of blocking agents: alcohols>lactams>phenols>oximes>pyrazoles>active methylene groups compounds. Products such as methylethylcetoxime (MEKO), diethyl malonate (DEM) and 3,5-dimethylpyrazole (DMP) are typical blocking agents used, for example, by Baxenden Chemicals Limited (Accrington, England). DMP's unblock temperature is between 110-120° C., melting point is 106° C. and boiling point is high, 218° C., without film surface volatilization problems. Trixene prepolymers may include 3,5-dimethylpyrazole (DMP) blocked isocyanates, which may be commercially available from Baxenden Chemicals Limited. The blocking groups H-BG (i.e. $T_{deblock}$ is within reservoir temperature range) generally fall into four groups according to Table 1.

TABLE 1

Deblocking temperatures of select isocyanate blocking groups

| Blocking group | $T_{deblock}$ (° F.) | Potential scavenger: |
|---|---|---|
| N-heterocycles (imidazoles, pyrazoles) | 175 to 220 | Redox agents, copper salts |
| Oximes | 260 to 300 | Nitriles, quinones with iron salts |
| β-diketones | 285 to 300 | Chromium(III) salts, iron salts |

Suitable isocyanate blocking agents may include alcohols, ethers, phenols, malonate esters, methylenes, acetoacetate esters, lactams, oximes, and ureas, among others. Other blocking agents for isocyanate groups include compounds such as bisulphites, and phenols, alcohols, lactams, oximes and active methylene compounds, each containing a sulfone group. Also, mercaptans, triazoles, pyrrazoles, secondary amines, and also malonic esters and acetylacetic acid esters may be used as a blocking agent. The blocking agent may include glycolic acid esters, acid amides, aromatic amines, imides, active methylene compounds, ureas, diaryl compounds, imidazoles, carbamic acid esters, or sulfites.

For example, phenolic blocking agent may include phenol, cresol, xylenol, chlorophenol, ethylphenol and the like. Lactam blocking agent may include gamma-pyrrolidone, laurinlactam, epsilon-caprolactam, delta-valerolactam, gamma-butyrolactam, beta-propiolactam and the like. Methylene blocking agent may include acetoacetic ester, ethyl acetoacetate, acetyl acetone and the like. Oxime blocking agents may include formamidoxime, acetaldoxime, acetoxime, methylethylketoxine, diacetylmonoxime, cyclohexanoxime and the like; mercaptan blocking agent such as butyl mercaptan, hexyl mercaptan, t-butyl mercaptan, thiophenol, methylthiophenol, ethylthiophenol and the like. Acid amide blocking agents may include acetic acid amide, benzamide and the like. Imide blocking agents may include succinimide, maleimide and the like. Amine blocking agents may include xylidine, aniline, butylamine, dibutylamine diisopropyl amine and benzyl-tert-butyl amine and the like.

Imidazole blocking agents may include imidazole, 2-ethylimidazole and the like. Imine blocking agents may include ethyleneimine, propyleneiniine and the like. Triazoles blocking agents may include compounds such as 1,2,4-triazole, 1,2,3-benzotriazole, 1,2,3-tolyl triazole and 4,5-diphenyl-1,2,3-triazole.

Alcohol blocking agents may include methanol, ethanol, propanol, butanol, amyl alcohol, ethylene glycol monomethyl ether, ethylene glycol monoethyl ether, ethylene glycol monobutyl ether, diethylene glycol monomethyl ether, propylene glycol monomethyl ether, benzyl alcohol, methyl glycolate, butyl glycolate, diacetone alcohol, methyl lactate, ethyl lactate and the like. Additionally, any suitable aliphatic, cycloaliphatic or aromatic alkyl monoalcohol may be used as a blocking agent in accordance with the present disclosure. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be used. Suitable cycloaliphatic alcohols include, for example, cyclopentanol, cyclohexanol and the like, while aromatic-alkyl alcohols include phenylcarbinol, methylphenylcarbinol, and the like.

Examples of suitable dicarbonylmethane blocking agents include: malonic acid esters such as diethyl malonate, dimethyl malonate, di(iso)propyl malonate, di(iso)butyl malonate, di(iso)pentyl malonate, di(iso)hexyl malonate, di(iso)heptyl malonate, di(iso)octyl malonate, di(iso)nonyl malonate, di(iso)decyl malonate, alkoxyalkyl malonates, benzylmethyl malonate, di-tert-butyl malonate, ethyl-tert-butyl malonate, dibenzyl malonate; and acetylacetates such as methyl acetoacetate, ethyl acetoacetate, propyl acetoacetate, butyl acetoacetate and alkoxyalkylacetoacetates; cyanacetates such as cyanacetic acid ethylester; acetylacetone; 2,2-dimethyl-1,3-dioxane-4,6-dione; methyl trimethylsilyl malonate, ethyl trimethylsilyl malonate, and bis(trimethylsilyl)malonate.

Malonic or alkylmalonic acid esters derived from linear aliphatic, cycloaliphatic, and/or arylalkyl aliphatic alcohols may also be used. Such esters may be made by alcoholysis using any of the above-mentioned alcohols or any monoalcohol with any of the commercially available esters (e.g., diethylmalonate).

For example, diethyl malonate may be reacted with 2-ethylhexanol to obtain the bis-(2-ethylhexyl)-malonate. It is also possible to use mixtures of alcohols to obtain the corresponding mixed malonic or alkylmalonic acid esters. Suitable alkylmalonic acid esters include: butyl malonic acid diethylester, diethyl ethyl malonate, diethyl butyl malonate, diethyl isopropyl malonate, diethyl phenyl malonate, diethyl n-propyl malonate, diethyl isopropyl malonate, dimethyl allyl malonate, diethyl chloromalonate, and dimethyl chloro-malonate.

Other isocyanate blocking agents are described in, for example, U.S. Pat. Nos. 6,288,176, 5,559,064, 4,637,956, 4,870,141, 4,767,829, 5,108,458, 4,976,833, and 7,157,527, U.S. Patent Application Publication Nos. 20050187314, 20070023288, 20070009750, 20060281854, 20060148391, 20060122357, 20040236021, 20020028932, 20030194635, and 20030004282, each of which is incorporated herein by reference.

Active hydrogen compounds such as polyols and polyamines may be reacted with the blocked isocyanate, such as those disclosed herein, to form the polyurethane gel and polyurea gel, respectively. Examples of polyols and polyamines are given in International Patent Application No. WO2008134359 which is incorporated herein by reference.

Blocked isocyanates offer wide advantages for oilfield use. First, they are stable formulations with excellent shelf life and no chance of setting below deblock temperature. Secondly, they have a lower exotherm in polymer-producing reactions; therefore they have a decreased chance of "runaway" reactions" or large autoaccelerations downhole. Thirdly, they have greatly a reduced evolution of $CO_2$ downhole. And fourthly, they have a decreased susceptibility to water contamination.

As long as the liberated blocking groups are present and the temperature remains high enough for polymerization to occur, polymerization is reversible and the polyurethane LCM will not be reliably solid in the loss zone. Therefore, the technical problems that need to be solved in deploying blocked isocyanates for downhole use are to identify methods to scavenge blocking groups that do not also affect polymerization (blocking groups are chemically related to alcohol or amine groups), and identify methods to heat the LCM to make it polymerize until it cools sufficiently to stop the depolymerization reactions. First problem may be solved by using specific additives with the PU system and second problem may be solved by using specific heating process of the PU system as it will be disclosed in the foregoing.

The blocking agents may be used in conjunction with deblocking and curing catalysts. These catalysts may include tin-containing catalysts such as tin-(II) salts of carboxylic acids, such as tin acetate, tin octoate, tin ethyl hexanoate and tin laurate, and tin-(IV) compounds, such as dibutyl tin dilaurate, dibutyl tin dichlorite, dibutyl tin diacetate, dibutyl tin dilaurate, dibutyl tin meleate or dibutyl tin diacetate. Other catalysts that may be used include metal acetonyl acetates, quaternary ammonium salts, zinc N-ethyl-N-phenyl dithiocarbamate, pentamethyldiethylenetriamine benzoate, cyclohexylamine acetate, N,N-dimethylcyclohexylamine acetate, ketimines, N-methyl morpholine, stannic chloride, butyl tin trichloride, bis(2-ethylhexyl)tin oxide, 1,3-diacetoxy tetrabutyl stannoxate, dibutyl dibutoxy tin, lead napthenate, bismuth trichloride, bismuth octonoate, tetra kis(2-ethylhexyl) titanate and tetrabutoxy titanium. The catalyst mentioned can be use separately or as a mixture with different ratios.

Catalysts can greatly accelerate polyurethane formation. Catalysts that have activity towards unblocked isocyanates generally have activity toward blocked isocyanates as well. A catalyst that accelerates polymerization only when it is triggered to become active by contact with wellbore fluid represents a way to enhance the triggered nature of the composition described above. According to one embodiment, such catalyst may be triethylammonium chloride, which is activated by contact with alkaline drilling mud. In laboratory experiments, a base formulation of Bayer LHT-240 polyol and BASF M-20 poly(methylene-bis-phenylenediisocyanate) has a curing time to ~4000 cP of ~300 minutes. The same formulation cures in 33 minutes when 0.1% triethylamine (the active form of the catalyst) is added. Trimethylammonium chloride does not enhance the cure time. However, the cure time is decreased to 33 minutes again when as little as 1 to 2% of a pH 10 xanthan solution is added. A PU system containing a catalyst that is activated by contact with wellbore fluids would enhance the "right angle turn" in chemical response that is desired for a triggered system.

According to one aspect of the method, the PU system is unblocked in situ by mix downhole of the blocked isocyanate, the hydrogen active compound and exposing the mix to a trigger characterized by a temperature increase and a catalyst. The trigger is in one embodiment, dependent of the location of activation. Accordingly, if the two conditions (temperature and catalyst) are present the PU will solidify and the PU LCM will be deployed; if not, the PU will not solidify. Temperature can be known in the well, and profile temperature can be defined. In this way it is possible to know where the PU solidification could occur depending of the blocked agent used. As well, the catalyst can be present is specific amount or specific location to trigger solidification. For example, the catalyst can be used in drilling mud or cement composition. As well, the catalyst can be in a first stage unreactive, because unactivated or protected in a capsule or shell and be in a second stage reactive after been activated or released from the capsule or shell. The catalyst can become active in response to some wellbore parameters: temperature, fluid, shear, pressure. For example, the release can occur trough shear done by the drill bit. The encapsulation can be done in a temperature-degraded shell or in a shear-degraded shell.

The temperature increase may be realized in various methods. The selection of the blocking agents may take into account the temperature of the formation being treated so that de-blocking or reactivation of the blocked free reactive groups takes place to allow the polyurethane system to react downhole. On the other way, the temperature can be increase externally. Most of these methods involve tools for resistive heating, microwave heating, and the like. For example, a commercial tool available from Schlumberger under the name PatchFLEX may be used. The system uses resistive heating on a wireline tool. As well, a system using microwave radiation downhole may be used.

Irrespective of the method of heating, it is true that selecting a PU system with an arbitrarily high deblock temperature and then exposing the system to that temperature by means of a heating element applied downhole represents triggered chemistry. This was demonstrated in the lab using a 1.1 kW microwave oven suitable for home use and a blocked isocyanate blend based on Bayer polyol LHT-240 (a well-defined small crosslinking triol with ~720 molecular weight) combined with Baxenden BI-7641 blocked isocyanate (deblock temperature 120° C.). Heating ~50 g samples in the microwave for 2 minutes at power levels of 5 (out of a possible 10) led to rapid, complete curing. The polymer samples set in the microwave had much higher Shore A durometer measurements than samples set in ovens. It was also noted that the temperature change for PU resin was ~75° C. after 1 minute exposure at power level 5 (vs. 50° C. for equivalent volumes of water in the same exposure to microwave radiation), indicating that the microwave absorption cross-section and/or the specific heat capacity of the resin actually work in favor of polymerization. A water-based blocked isocyanate (Baxenden BI-7892, deblock temperature 120° C.) also showed greater heating than the water sample and better quality polymer than is available from conventional heating. Taken together, these facts suggest that the presence of water will not impair the embodiments disclosed herewith.

The PU system may be used with various additives or fillers. Use of fillers may serve to improve properties including strength, density, and bulk, and to reduce polymer costs. Many different solid particles, inert or otherwise, are available. The polyurethane with the blocking agent may be dispersed in a suitable treatment carrier fluid and introduced into the formation. The solvent used for the carrier fluid will also typically be non-reactive with the polyurethane. The carrier solvent may include those solvents without active hydrogen. These may include esters, such as ethyl acetate, butyl acetate, amyl acetate, dipropyl acetate, cellosolve acetate, carbitol acetate or dimethylesters of dibasic acids; ketones such as methyl ethyl ketone, methyl isobutyl ketone or cyclohexanone; ethers, such as dipropyl ether, dioxane and tetrahydrofuran; and hydrocarbons such as toluene, benzene, xylene, mineral oil, mineral spirits, diesel, bio-diesel (methyl ester, ethyl ester) or oil; chlorinated hydrocarbon solvents such as methylene chloride, trichloroethylene, perchloroethylene, chlorobenzene, dichlorobenzene; and nitoraliphatic solvents. All the solvents may be used individually or as a mixture.

Other additives of the PU may include fibrous materials. These fibrous materials may be used in the form of mats, tows, full-length fibers, non-woven structures, woven structures or random staple-fiber mixtures, glass fibers. Calcium carbonate, fine cement, colloidal silica, carbon black, silica gel, gypsum, active carbon, silicones, fungistatic and/or bacteriostatic agents can also be added.

According to a second aspect of the method, the PU system may use a filler to scavenge blocking groups. As deblock temperature is reached, polyol groups begin to react with blocked isocyanates, and the blocking groups are liberated. If the blocking groups are scavenged, polymerization becomes irreversible because the chemical equilibrium in FIG. 1 is pushed toward the right. Fillers that were potentially capable of scavenging blocking groups were screened for their ability to lower the concentration of 2,4-pentanedione (acetylacetone, a prototypical blocking group) in both water and mineral spirits. In this testing, ~300 mg samples of carbon black, Laponite XLG clay, D020 bentonite clay, and Cab-O-Sil TS-730 were suspended in 20 ml aliquots of millimolar solutions of pentanedione in water or mineral spirits. The samples were agitated in a shaker bath at 50° C. for 2 hours followed by centrifuge filtration. The liquid filtrate was analyzed by UV spectroscopy at 274 nm to evaluate the concentration of pentanedione. The results identified bentonite in mineral spirits as a potential combination where concentration of pentanedione was substantially reduced.

In a subsequent experiment, a blocked isocyanate blend based on Bayer polyol LHT-240 (a well-defined small crosslinking triol with ~720 molecular weight) was combined with Baxenden BI-7641 blocked isocyanate. A 3 ml control portion was heated to 250° F. overnight in a pressurized vessel pressured up to 800 psi with $N_2$, along with samples containing 300 and 600 mg of bentonite and 300 and 600 mg of Laponite XLG. Polymer hardness data as measured by the Shore A durometer tester are given in Table 2.

TABLE 2

Polymer sample Shore A durometer results

| Sample | Shore A durometer |
|---|---|
| 1. LHT-240 + BI-7641 resin mixture | 54 |
| 2. Resin mixture + 300 mg Bentonite | 64 |
| 3. Resin mixture + 600 mg Bentonite | 71 |
| 4. Resin mixture + 300 mg Laponite XLG | 56 |
| 5. Resin mixture + 600 mg Laponite XLG | 63 |

The inference here is that bentonite acts to strengthen the polymer in a way that the synthetic clay Laponite XLG does not. There is a secondary trend toward higher durometer with increasing filler, which is expected.

According to a further aspect of the method, fillers may also have a role to play in microwave heating of downhole fluids. Certain substances (e.g. carbon black, silicon carbide) are known to be susceptors for microwave radiation in that they increase the microwave absorption cross-section of a material into which they are mixed. 50 ml samples of a blocked isocyanate blend based on Bayer polyol LHT-240 (a well-defined small crosslinking triol with ~720 molecular weight) combined with Baxenden BI-7641 blocked isocyanate (deblock temperature 120° C.) that contained 2 g powdered silicon carbide (carborundum) showed temperature changes of 91 to 93° C. when heated for 1 minute in the microwave at power level 5, as compared to the carborundum-free sample which only changed temperature by 75° C.

Techniques for injection of the PU system downhole are well known in the art. Typically, the PU system is injected through the wellbore into the formation. Formations for which lost circulation treatment is desirable include sand, sandstone, chalk, and limestone, among others. The PU system is suitable for use in all formation types. The volume of fluid to be injected into the formation is a function of the formation to be treated and the ability of the fluid to penetrate the formation. The volume of fluid to be injected can be readily determined by one of ordinary skill in the art.

Lost circulation is a major issue in drilling and cementing. Lost circulation can occur when zones with extremely high local porosity/permeability or networks of natural fractures are contacted by the wellbore. The method includes injecting the PU system and solidifying the PU system with heat and catalyst to treat the subterranean formation. The treatment is according to this embodiment a lost circulation treatment.

Methods currently disclosed can be combined with conventional known techniques e.g. hydraulic fracturing. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid can comprise either a proppant, to physically hold the fractures open, or an acid, which can etch the faces of the fracture to provide pores for hydrocarbon production. The fracturing fluid comprises a proppant.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method comprising:
    a. providing a composition with at least one isocyanate including a blocking group able to be unblocked at or above a deblocking temperature;
    b. contacting the composition with an inactivated catalyst and at least one active hydrogen compound;
    c. exposing the composition to a trigger to activate the catalyst; and
    d. creating an elastomeric gel composition; and
    e. exposing the composition to a temperature above the deblocking temperature with a second downhole tool, wherein the second downhole tool is able to generate microwaves.

2. The method of claim 1, wherein the method applies to treating a subterranean formation penetrated by a wellbore, and further comprising introducing the composition into the wellbore.

3. The method of claim 2, further comprising introducing a first downhole tool or conveyance in the wellbore, and wherein the trigger is generated from the first downhole tool or conveyance.

4. The method of claim 1, wherein the inactivated catalyst is inactivated by encapsulation of the catalyst.

5. The method of claim 4, wherein the inactivated catalyst is encapsulated titanate, encapsulated zirconate, encapsulated bismuth compounds, encapsulated tin compounds, encapsulated lead compounds, encapsulated zinc compounds, encapsulated manganese compounds, encapsulated iron compounds, encapsulated cobalt compounds, encapsulated antimony compounds, or combinations thereof.

6. The method of claim 1, wherein the trigger is temperature, electromagnetic radiation, chemical compound, pressure, or shear.

7. The method of claim 6, wherein the electromagnetic radiation is microwave.

8. The method of claim 1, wherein the composition further comprises a first filler able to scavenge the blocking group when the temperature is above the deblocking temperature.

9. The method of claim 8, wherein the first filler is bentonite.

10. The method of claim 1, wherein the composition further comprises a second filler with microwave susceptor.

11. The method of claim 10, wherein the second filler is carbon black or silicon carbide.

12. The method of claim 1, wherein the elastomeric gel composition is solid.

13. A method comprising:
    a. providing a composition with a first filler and at least one isocyanate including a blocking group able to be unblocked at or above a deblocking temperature;
    b. contacting the composition with at least one active hydrogen compound;
    c. exposing the composition to a temperature above the deblocking temperature allowing the blocking group to be scavenged by the first filler; and
    d. creating an elastomeric gel composition;
    wherein the step of exposing the composition to a temperature above the deblocking temperature is done with a second downhole tool; and
    wherein the second downhole tool is able to generate microwaves.

14. The method of claim 13, wherein the composition further comprises an inactivated catalyst and the method comprises the step of exposing the composition to a trigger to activate the catalyst.

15. The method of claim 14, wherein the inactivated catalyst is inactivated by encapsulation of the catalyst.

16. The method of claim 15, wherein the inactivated catalyst is encapsulated titanate, encapsulated zirconate, encapsulated bismuth compounds, encapsulated tin compounds, encapsulated lead compounds, encapsulated zinc compounds, encapsulated manganese compounds, encapsulated iron compounds, encapsulated cobalt compounds, encapsulated antimony compounds, or combinations thereof.

17. The method of claim 14, wherein the trigger is temperature, electromagnetic radiation, chemical compound, pressure, or shear.

18. The method of claim 17, wherein the electromagnetic radiation is microwave.

19. The method of claim 14, further comprising introducing a first downhole tool in the wellbore, and wherein the trigger is generated from the first downhole tool.

20. The method of claim 13, wherein the first filler is bentonite.

21. The method of claim 13, wherein the composition further comprises a second filler with microwave susceptor.

22. The method of claim 21, wherein the second filler is carbon black or silicon carbide.

23. The method of claim 13, wherein the method applies to treating a subterranean formation penetrated by a wellbore, and further comprising introducing the composition into the wellbore.

24. The method of claim 23, wherein the method treats lost circulation in the wellbore.

* * * * *